Palmer & Case.
Double Tree.
N° 80872.      Patented Aug. 11, 1868.
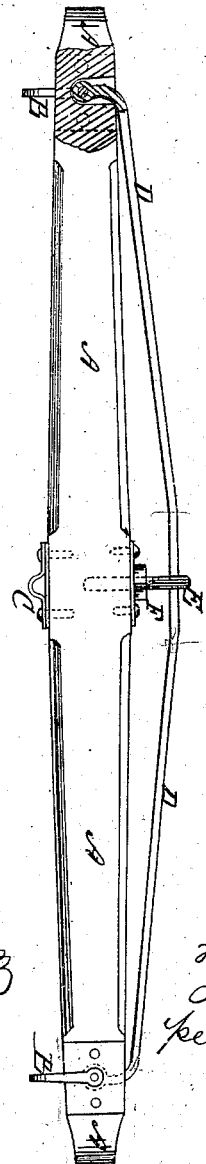
Witnesses:
W. C. Ashkettle
Wm A. Morgan
Inventor:
Horace Palmer
A. N. Case
per Munn
Attorneys

United States Patent Office.

HORACE PALMER AND ASA N. CASE, OF KINGSVILLE, OHIO.

Letters Patent No. 80,872, dated August 11, 1868.

IMPROVEMENT IN DOUBLE-TREE.

*The Schedule referred to in these Letters Patent and making part of the same.*

TO ALL WHOM IT MAY CONCERN:

Be it known that we, HORACE PALMER and ASA N. CASE, of Kingsville, in the county of Ashtabula, and State of Ohio, have invented a new and useful Improvement in Double-Trees, &c.; and we do hereby declare that the following is a full, clear, and exact description thereof, which will enable others skilled in the art to make and use the same, reference being had to the accompanying drawings, forming part of this specification, in which—

The figure is a top view of a double-tree to which our improvement has been attached, part being broken away to show the construction.

Similar letters of reference indicate like parts.

Our invention has for its object to furnish a simple attachment for double-trees, whiffle-trees, neck-yokes, &c., where the power is applied to the ends of a wooden bar, and the resistance is sustained at its centre, so as to greatly strengthen said bar, without materially increasing its weight.

It consists in the combination of an iron brace-rod, eye-bolt, and adjusting-nut, with the wooden bar, as hereinafter more fully described.

A represents the wooden bar of a double-tree, to which the clevises B and socket C for the hammer-pin are attached in the ordinary manner.

D is the strengthening-rod or brace, which runs along the rear side of the bar A.

The ends of the rod D are bent forward at right angles, have eyes or holes formed in them, and enter sockets formed in the ends of the wooden bar A, to receive them in such positions that the clevis-pins may pass through the said eyes or holes, and secure the rod or brace D in place.

E is an eye-bolt, which enters a hole or socket formed in the rear side of the central part of the bar A, to receive it, and through the eye of which passes the brace-rod D.

F is a nut screwing upon the eye-bolt E, and which rests against the rear side of the wooden bar A, so that by turning the said nut F in one or the other direction, the said rod D may be strained more or less tightly, as may be desired.

In the case of neck-yokes, whiffle-trees, and double-trees, where the resistance is sustained by a tongue-ring, eye, or staple, upon the same side of the bar A with the brace-rod D, two eye-bolts E, or their equivalent, should be used, one being placed upon each side of said ring, eye, or staple.

By this construction the strength of the wooden bar A is so materially increased by the rod D, that the said wooden bar A may be made much lighter than would otherwise be possible, while still furnishing the necessary strength.

Having thus described our invention, we claim as new, and desire to secure by Letters Patent—

The brace-rod D, whose ends enter recesses in the rear edge of the wooden bar A, and are connected therein to the clevises B, when said rod is adjusted nearer to or further from the bar by the eye-bolt E, embracing its centre, as herein shown and described.

HORACE PALMER,
ASA N. CASE.

Witnesses:
Q. A. CASE,
A. E. WHITNEY.